Patented May 16, 1933

1,909,202

UNITED STATES PATENT OFFICE

CHARLES F. LYTLE, OF SIOUX CITY, IOWA

ART AND PRODUCT OF MASONRY JOINT FILLERS

No Drawing.   Application filed August 1, 1929.   Serial No. 382,777.

This invention relates to improvements in joint forming material for masonry and the art of producing the same, and has as its essential object facilitating the easy, rapid, and effective filling of masonry joints with characteristically wear-resisting material which offers practically no resistance to changing-temperature-produced expansion and contraction.

In the construction of hydraulic cement concrete roads, and other masonry, it has been proposed to provide for variable contraction and expansion by providing at appropriate intervals or locations elastic joints, and tar, pitch, asphaltum, and other weather-resisting elastic substances have been proposed. But such materials are either proposed for use by pouring when heated, or to be mixed with comminuted filler material and cast into pre-formed key strips. The pre-formed strips inevitably possess stability to maintain form and, therefore, lack the requisite plasticity and adhesive qualities to effectively unify with the adjacent masonry surfaces and to dependably resist displacement during use. On the other hand, the poured keys, that is those fillers which are formed by manually delivering a stream of molten or otherwise liquid asphaltum or tarry substance directly into the key-way or expansion crevice in the masonry, while abundantly adhesive are not sufficiently cohesive or stable and readily exude and adhere to tires of passing vehicles, especially on hot days. Thus a large percentage of such filler is soon lost which, by requiring periodical replacement, increases cost of road maintenance. A proposed remedy has included addition of sand, but sand quickly gravitates to the bottom of the key-way, and the condition is not improved.

Among the objects of the present invention is the provision of a stabilizing filler which will not prohibitively limit adhesion or plasticity when being applied, and will remain, during use, permanently in suspension, and will yet afford effective wear resistance and obviate adhesion to tires, and yet effectively unify with adjacent masonry.

To accomplish these and other objects as will in part hereinafter become apparent and in part be stated, sawdust is added (preferably slowly) to molten asphaltum or the equivalent liquid tarry substance, while the mass is being thoroughly triturated, and the addition is continued up to the saturation point. By saturation point is meant that relative quantity of sawdust with respect to the tarry substance where all the sawdust has been supplied which the tarry substance is capable of coating and saturating sufficiently for the mass to be slowly fluid when heated, that is, the state sometimes roughly called semi-fluid, or, in other words, a state in which the substance is capable while hot of being slowly poured. The mixture will be found, while hot, to readily conform to contiguous surfaces and to adhere to them, and thereafter will continue to adhere while allowing readily for bulk variation of such walls, and, at the same time, when cold and set, presenting an exposed or wear surface continuous of the masonry well adapted to resist wear and adhesion of tires. Spreading and loss are avoided, and long continued service assured.

The wood employed for the sawdust is capable of a wide range of variation, and may be hard wood, such as oak or ash, but should be sufficient cellular and buoyant to reasonably readily be saturated by the hot tarry fluid and to remain in suspension therein.

The substance may be prepared at any time ahead of use, and, if desired, may be kept in stock in bulk form, but is not to be used, nor will it be found effective for use, in a cold, congealed or set condition. When to be applied, the mixture is raised to a temperature a little higher than the melting point of the asphaltum or other tarry substance and kept at such temperature until the whole mass acquires again its slow fluidity. The hot mixture is then poured into the key-ways, and soon cools and sets and is ready for traffic. Reheating is, of course, obviated if the mixture is poured into the masonry expansion recesses immediately upon completion and while still hot. If made and stored and requiring reheating, care should be exercised to insure uniform distribution of the heat, as by appropriate stirring or other agitation of the mixture.

It is contemplated in using sawdust or similar material for admixture with the asphalt to saturate such material with kerosene or similar light oils before mixing the same with asphalt substance. This saturation enables the sawdust to retain its natural resiliency better than if the voids in the sawdust were filled with asphalt.

What is claimed is:

1. The art of filling masonry expansion crevices, comprising treating sawdust with a pore filling substance to fill the pores thereof, adding to molten tarry substance a sufficient quantity of the sawdust to saturate the tarry substance and reduce the mixture to slow fluidity while heated, and pouring the heated mixture into place.

2. The art of filling masonry expansion crevices comprising saturating sawdust with a pore filling substance to fill the pores thereof, and then coating the sawdust with tarry substance while heated to reduce the mixture to a slowly fluid mass while heated, and pouring the heated mass into place.

3. The art of filling masonry expansion crevices, comprising saturating sawdust with a pore-filling substance, adding to molten tarry substance a sufficient quantity of such sawdust to reduce the mixture to slow fluidity while heated, and pouring the heated mixture into place.

4. The art of filling masonry expansion crevices, comprising treating a comminuted porous filler with a light oil to fill the pores thereof, adding a sufficient quantity of the treated comminuted filler to molten tarry substance to saturate the said tarry substance to prevent segregation of the materials and reduce the mixture to slow fluidity when heated, and pouring the heated mixture into place.

5. The art of filling masonry expansion crevices, comprising treating a comminuted porous filler with kerosene to fill the pores thereof, adding a sufficient quantity of the treated comminuted filler to molten tarry substance to saturate the said tarry substance to prevent segregation of the materials and reduce the mixture to slow fluidity when heated, and pouring the heated mixture into place.

In testimony wherof I affix my signature.

CHARLES F. LYTLE.